United States Statutory Invention Registration [19]

[11] Reg. Number: H171

McDaniel et al. [43] Published: Dec. 2, 1986

[54] BRANCHED CHAIN GLYCOSIDES

[75] Inventors: Robert S. McDaniel, Decatur; Leonard F. Vander Burgh, Bethany; Allen D. Urfer, Decatur, all of Ill.

[73] Assignee: A. E. Staley Manufacturing Company, Decatur, Ill.

[21] Appl. No.: 748,258

[22] Filed: Jun. 24, 1985

[51] Int. Cl.[4] ..... C11D 1/66

[52] U.S. Cl. ..... 252/174.17; 252/DIG. 1; 536/4.1

[58] Field of Search ..... 252/174.17; 536/4.1

[56] References Cited

U.S. PATENT DOCUMENTS

| | | | |
|---|---|---|---|
| 3,219,656 | 11/1956 | Boettner | 260/210 |
| 3,547,828 | 12/1970 | Mansfield et al. | 252/351 |
| 3,598,865 | 8/1971 | Baak | 260/210 R |
| 4,223,129 | 9/1980 | Roth et al. | 536/4 |
| 4,393,203 | 7/1983 | Mao et al. | 536/124 |
| 4,425,458 | 1/1984 | Lindaer et al. | 524/314 |
| 4,483,779 | 11/1984 | Llenado | 252/135 |
| 4,483,780 | 11/1984 | Llenado | 252/135 |
| 4,488,981 | 12/1984 | Urfer et al. | 252/174.17 |

*Primary Examiner*—John F. Terapane
*Assistant Examiner*—Susan Wolffe

[57] ABSTRACT

The invention describes branched glycosides which are substantially liquid materials at high solids concentration.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BRANCHED CHAIN GLYCOSIDES

BACKGROUND OF THE INVENTION

1. Field of the Invention

The present invention describes glycoside materials particularly those which are liquid at high solids concentration.

2. Description of the Art Practices

Glycosides have long been known as materials which are useful in detergent compositions. For instance, Boettner, in U.S. Pat. No. 3,219,656 issued Nov. 23, 1965 suggests that glycosides may be utilized in detergent compositions. Further, Mansfield in U.S. Pat. No. 3,547,828 issued Dec. 15, 1970 suggests that mixtures of monoglycosides, alcohols, and polyglycosides are suitable as detergent compositions.

It has further been suggested in Llenado, U.S. Pat. No. 4,483,780 issued Nov. 20, 1984 that mixtures of glycosides and other surfactants may be employed. The Llenado patent generally describes the combination of nonionic surfactants and polyglycosides and includes a disclosure that branched glycosides may be utilized. Branched glycosides are also mentioned in U.S. Pat. No. 4,488,981 issued Dec. 18, 1984 to Urfer et al.

The present invention is directed to the discovery that glycosides which contain branching at the 2-position on the aglycone moiety (from the point of attachment to the saccharide) are extremely effective detergent materials and may be obtained at 100% active as a liquid. The present invention further describes glycosides which contain branching at points on the molecule at points further than the 2-position on the aglycone portion of the glycoside.

It has further been discovered in the present invention that the branched-chain glycosides of the present invention particularly those containing less than 12 carbon atoms are particularly easy to prepare at high purity. Such products obtained herein are therefore substantially free of lower glycosides which are typically used to prepare the glycosides of the present invention. Thus the products of this invention are more effective cleaning agents on a given weight basis.

To the extent that patents and literature articles are referred to herein, they are incorporated by reference. Temperatures herein are in degrees Celsius, and percentages and ratios are by weight, and pressures are in KPascals unless otherwise indicated.

SUMMARY OF THE INVENTION

Glycosides which are useful for various purposes are described herein as a composition of matter comprising a glycoside of the formula:

$$R(OG)$$

wherein R is an alkyl or alkenyl moiety containing branching at the 2 or higher position on R wherein the branching is selected from the group consisting of methyl, ethyl, isopropyl, normal propyl, butyl, pentyl, hexyl, and mixtures thereof; G is a saccharide moiety selected from the group consisting of glucose, fructose, mannose, galactose, talose, gulose, allose, altrose, idose, arabinose, xylose, lyxose and ribose and mixtures thereof; provided further that R contains from about 7 to about 30 carbon atoms.

A further aspect of the invention is a glycoside of the formula:

$$R(OG)_x$$

wherein R is an alkyl, or alkenyl moiety containing branching at the 2 or higher position on R wherein the branching is selected from the group consisting of methyl, ethyl, isopropyl, normal propyl, butyl, pentyl, hexyl, and mixtures thereof; G is a saccharide moiety selected from the group consisting of glucose, fructose, mannose, galactose, talose, gulose, allose, altrose, idose, arabinose, xylose, lyxose and ribose and mixtures thereof; provided further that R contains from about 7 to about 30 carbon atoms; and x on average is a number greater than or equal to 2.

DETAILED DESCRIPTION OF THE INVENTION

The present invention deals with obtaining glycosides which while having a high solids content are materials which are liquids at room temperature (20° C.). The products are also obtainable as extremely high active materials in that the method of preparation allows for co-distillation of butanol with the branched alcohol used to form the glycoside thereby allowing continuous processing to reduce the content, for instance, of butanol and butyl glycoside while manufacturing the branched glycoside of the present invention.

In the structural formula given in the Summary of the Invention, it is stated that the group R is an alkyl or alkenyl moiety containing branching at the 2 or higher position. The glycosides of the present invention are preferably alkyl rather alkenyl materials and the branching is preferably at the 2-position of the molecule.

The branched portion of the molecule may be methyl, ethyl, isopropyl, normal propyl, butyl, pentyl, hexyl and mixtures thereof. It is preferred that the branch on the aglycone portion of the molecule be methyl or ethyl. It is not particularly important to the present invention that the branching be a single branch as opposed to multiple branches on the aglycone portion of the molecule. The remainder of the aglycone portion is therefore a straight-chain carbon backbone with the exception of the branching previously mentioned.

The moiety R, as described above, typically contains from about 7 to about 30 carbon atoms, preferably from about 7 to about 18 carbon atoms and most preferably from about 8 to about 16 carbon atoms in total. Particularly preferred glycosides utilizable in the present invention are those derived from 2-ethylhexyl alcohol or isooctyl alcohol (e.g., where the R portion of the molecule is obtained from the foregoing alcohols).

A further variable within the present invention is the use of guerbet alcohols to obtain the desired degree of branching. A description of guerbet alcohols utilizable in the forming the glycosides of the present invention is found in U.S. Pat. No. 4,425,458 issued to Lindner et al. on Jan. 10, 1984. It is noted at this poiont that the compounds of the present invention which are most easily obtainable as having high solids and high purity while being substantially liquid at room temperature are monoglycosides of the type described herein. It is further noted, however, that due the solubilizing properties of the particular monoglycosides contained in the present invention that the polyglycosides obtainable from the branched-chained monoglycosides are easily solubilized.

Therefore, mixtures of glycosides of the type described herein containing the monoglycoside and higher glycosides having a degree of polymerization of greater than 2 may be obtained. The polyglycosides have the formula:

$$R(OG)_x$$

wherein R, O, and G each have the foregoing definitions and x is the degree of polymerization (DP) of glycoside. The value for x is an average greater than or equal to 2, preferably averaging from about 2 to about 10.

Preferably, the ratio of the branched-chained monoglycoside to the branched-chained polyglycoside is from about 20:1 to about 1:4; preferably from about 10:1 to about 1:1. The glycosyl portion of the molecule is a member selected from the group consisting of glucose, fructose, mannose, galactose, talose, gulose, allose, altrose, idose, arabinose, xylose, lyxose and ribose and mixtures thereof. Most preferably, the glycosyl (saccharide) portion of the molecule is glucose although fructose may also be utilized.

A further desirable aspect of the present invention is that of using the branched-chained glycosides of the present invention to solubilize higher straight-chain glycosides to increase their water solubility. For instance, a glycoside of the formula:

$$A(OG)_y$$

wherein A is a straight-chained alkyl, alkenyl or aromatic moiety containing from about 6 to about 30 carbon atoms preferably about 8 to about 20 carbon atoms; G is as previously described in the present invention and y is the average degree of polymerization of the straight-chain glycoside which is from about 1 to about 20; preferably from about 1.2 to about 10. The aromatic moiety may be of the alkaryl or aralkyl variety. Most preferably the straight-chain glycoside is derived from glucose or fructose.

Preferably, the ratio of the branched-chained monoglycoside to the non-branched glycoside is from about 50:1 to about 1:50; preferably from about 20:1 to about 1:20.

The glycosides of the present invention may be generally obtained according to Mansfield U.S. Pat. No. 3,547,828 issued on Dec. 15, 1970 or according to Roth et al. U.S. Pat. No. 4,223,129 issued Sept. 16, 1980. Moreover, the reduction of the free-fatty alcohol content in the glycoside products of the present invention may be obtained according to Mao U.S. Pat. No. 4,393,203 issued July 12, 1984.

The products obtained from the present invention in addition to being high active, and substantially liquid at room temperature are excellent surfactant materials.

Other materials which may be incorporated within the compositions herein include, depending upon the use employed, an anionic surfactant such as an alkylsulfate, paraffin sulfate, paraffin sulfonate, olefin sulfonate, alkylether sulfate, or an alkylbenzene sulfonate. These anionic surfactants are typically found in the form of their sodium, potassium or ammonium salt. Nonionic surfactants and anionic brighteners and mixtures thereof as described in the examples and specification of Llenado et al. U.S. Pat. No. 4,483,779 issued Nov. 20, 1984 are also useful herein.

Additional ingredients which may be employed herein are materials such as detergent builders and abrasive materials for hard surface cleaning such as calcium carbonate. The amount abrasive or silica which may included in the compositions of the present invention is typically from about 2% to about 40%; typically from about 3% to about 30% by weight. Builders may be employed at similar levels. Suitable builders include the phosphates, NTA, aluminosilicates and the builders of Valenty disclosed in U.S. applications, Ser. Nos. 06/575,421 and 06/664,451 filed Jan. 31, 1984 and Oct. 23, 1985 respectively.

The following is a suggested exemplification of the present invention.

EXAMPLE I

A product according to the present invention is obtained by placing 952 parts of 2-ethylhexanol into a glass reaction vessel equipped to reduce the pressure to 10 KPa (absolute). The reaction vessel is further described as being capable of maintaining a temperature from 110°-115° C.

A butyl glucoside solution (248 parts glycoside in 591 parts butanol) is added to the alcohol over a period of approximately 2 hours. Following the point where approximately ½ of the butyl glucoside is added, an additional 100 parts of 2-ethylhexanol is added due to the volume of alcohol co-distilled with the butanol from the reaction vessel.

Following the completion of the butyl glucoside addition, an extra 200 parts of 2-ethylhexanol is then added to maintain the reaction volume. The mixture is maintained at from 110°-115° C. for an additional 2 hours and then cooled to 20° C.

The foregoing reaction is catalyzed using an acid catalyst described as para-toluene sulfonic acid at 6 meq. per mole butyl glucoside.

The product obtained herein at this point in the reaction is:

71.4% 2-ethylhexanol
17.4% DP1
1.6% DP2
0.4% DP3
1.2% DP4
0.6% DP5
2.5% DP6
0.7% butanol
3.6% butyl glycoside
0.6% not identified The dry solids content is 27.9%

In the foregoing, the terminology DP1 and the like describes the degree of polymerization of the glycoside, (e.g., the number of saccharide units joined together; with DP1 being a monoglycoside).

The above product is then treated to neutralize the catalyst with a strong base anionic ion-exchange resin to pH 7. The 2-ethylhexanol excess is removed in vacuum by co-distilling with first butanol, and finally with water to form an aqueous glycoside mixture. The distillation method allows a low temperature distillation of the excess alcohol which in turn gives a lighter colored product.

The product is than further treated with ion exchange resin and a 50% aqueous product is obtained having the following 2-ethylhexyl glycoside nominal composition:

71.9% 2-ethylhexyl glycoside DP1
5.9% 2-ethylhexyl glycoside DP2
2.0% 2-ethylhexyl glycoside DP3
7.0% 2-ethylhexyl glycoside DP4
6.2% 2-ethylhexyl glycoside DP5

2.3% 2-ethylhexyl glycoside DP6

4.7% 2-ethylhexyl glycoside DP7 and higher

The density of the product is 1.073 g/cc at 25° C. Substantially, similar results are obtained with isooctyl alcohol to give the corresponding glycoside.

EXAMPLE II

The product of Example I is evaporated at 1 KPa vacuum at 95° C. to a constant weight to give a liquid product having the nominal composition of Example I.

What is claimed is:

1. A glycoside composition comprising:

a. a branched chain monoglycoside of the formula:

$$R(OG);$$

b. a branched chain polyglycoside of the formula:

$$R(OG)_x; \text{ and}$$

c. a straight chain glycoside of the formula:

$$A(OG)_y$$

wherein R is an alkyl or alkenyl moiety containing from about 7 to about 30 carbon atoms and containing branching at the 2 or higher position on R wherein the branching is selected from the group consisting of methyl, ethyl, isopropyl, normal propyl, butyl, pentyl, hexyl, and mixtures thereof; G is a saccharide moiety selected from the group consisting of glucose, fructose, mannose, galactose, talose, gulose, allose, altrose, idose, arabinose, xylose, lyxose and ribose and mixtures thereof; x is a number equal to or greater than 2; A is a straight-chained alkyl, alkenyl or aromatic moiety containing from about 6 to about 30 carbon atoms; and y has an average value of from about 1.2 to about 10 and wherein the weight ratio of the branched chain monoglycoside to the branched chain polyglycoside is from about 20:1 to about 1:4 and the weight ratio of the branched chain monoglycoside to the straight chain glycoside is from about 50:1 to about 1:50.

2. The composition of claim 1 wherein G is glucose.

3. The composition of claim 1 wherein G is fructose.

4. The composition of claim 1 wherein R is 2-ethylhexyl.

5. The composition of claim 1 wherein R is isooctyl.

6. The composition of claim 1 wherein R is derived from a guerbet alcohol.

7. The composition of claim 1 wherein x averages from about 2 to about 10.

8. The composition of claim 1 wherein A contains between about 8 and 20 carbon atoms.

9. The composition of claim 1 wherein the weight ratio of the branched-chain monoglycoside to the branched-chain polyglycoside is from about 10:1 to about 1:1.

10. The composition of claim 9 wherein the weight ratio of the branched-chain monoglycoside to the straight chain glycoside is from about 20:1 to about 1:20.

* * * * *